United States Patent
Benmoussa

(10) Patent No.: US 8,905,347 B2
(45) Date of Patent: Dec. 9, 2014

(54) METHOD OF RESETTING THE ORIENTATION OF AN AIRCRAFT UNDERCARRIAGE HAVING A STEERABLE BOTTOM PORTION

(71) Applicant: Messier-Bugatti-Dowty, Velizy Villacoublay (FR)

(72) Inventor: Michaël Benmoussa, Velizy-Villacoublay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 109 days.

(21) Appl. No.: 13/668,502

(22) Filed: Nov. 5, 2012

(65) Prior Publication Data
US 2013/0233966 A1   Sep. 12, 2013

(30) Foreign Application Priority Data
Nov. 10, 2011 (FR) ..................... 11 60268

(51) Int. Cl.
*B64C 25/50* (2006.01)
(52) U.S. Cl.
CPC ..................... *B64C 25/50* (2013.01)
USPC .............................. 244/50; 244/103 R; 701/3
(58) Field of Classification Search
USPC .................. 244/50, 103 R, 102 SS
See application file for complete search history.

(56) References Cited

U.S. PATENT DOCUMENTS

| | | | | |
|---|---|---|---|---|
| 3,070,336 A | * | 12/1962 | Lear, Sr. | 244/103 R |
| 3,285,541 A | * | 11/1966 | Fehring et al. | 244/50 |
| 3,823,899 A | * | 7/1974 | Currey | 244/103 W |
| 4,113,041 A | * | 9/1978 | Birkeholm | 180/14.1 |
| 4,984,755 A | * | 1/1991 | Derrien | 244/102 SS |
| 4,991,862 A | * | 2/1991 | Tsao et al. | 280/421 |
| 5,167,385 A | * | 12/1992 | Hafner | 244/76 R |
| 5,704,568 A | * | 1/1998 | Watts | 244/50 |
| 5,947,414 A | * | 9/1999 | Ralph | 244/50 |
| 6,065,719 A | * | 5/2000 | Ralph | 244/50 |
| 6,123,292 A | * | 9/2000 | Ralph | 244/50 |
| 6,722,610 B1 | * | 4/2004 | Rawdon et al. | 244/103 W |
| 7,630,805 B2 | * | 12/2009 | Lu et al. | 701/45 |
| 7,708,225 B2 | * | 5/2010 | Thulbon | 244/102 SL |
| 7,731,122 B2 | * | 6/2010 | Frank | 244/50 |

(Continued)

FOREIGN PATENT DOCUMENTS

FR   2 787 761 A1   6/2000
WO   2006/010890 A1   2/2006

OTHER PUBLICATIONS

French Search Report of FR 11 60268 dated Jul. 18, 2012.

*Primary Examiner* — Christopher P Ellis
*Assistant Examiner* — Medhat Badawi
(74) *Attorney, Agent, or Firm* — Sughrue Mion, PLLC

(57) ABSTRACT

The invention provides a steering resetting method for an aircraft undercarriage that includes a leg in which a steerable bottom portion is mounted to slide against a suspension force generated by a shock absorber, the undercarriage being provided with a controllable steering member for causing the steerable bottom portion to swivel in response to an angular position setpoint, the undercarriage also including at least one angular position sensor adapted to generate an electrical signal representative of the angular position of the steerable bottom portion and suitable for use in controlling the steering member; the method comprises the step, performed when the steerable bottom portion is in an indexed angular position while the aircraft is in flight and the undercarriage is fully extended, of setting the electrical signal from the sensor to a determined reset value.

4 Claims, 1 Drawing Sheet

(56) References Cited

U.S. PATENT DOCUMENTS

| | | | |
|---|---|---|---|
| 8,094,042 B2* | 1/2012 | Read et al. | 340/960 |
| 8,214,090 B2* | 7/2012 | Villaume et al. | 701/13 |
| 8,321,088 B2* | 11/2012 | Brown et al. | 701/38 |
| 8,523,107 B2* | 9/2013 | Salmon et al. | 244/102 A |
| 8,660,711 B2* | 2/2014 | Bailbe et al. | 701/3 |
| 2002/0124629 A1* | 9/2002 | Hurson | 73/9 |
| 2004/0177671 A1* | 9/2004 | Hurson | 73/9 |
| 2005/0082427 A1* | 4/2005 | Seung | 244/102 R |
| 2005/0218263 A1* | 10/2005 | Udall | 244/102 R |
| 2007/0260365 A1* | 11/2007 | Furgal | 701/3 |
| 2007/0282491 A1* | 12/2007 | Cox et al. | 701/3 |
| 2008/0082246 A1* | 4/2008 | Brown et al. | 701/91 |
| 2008/0185476 A1* | 8/2008 | Suisse et al. | 244/78.1 |
| 2008/0188998 A1* | 8/2008 | Venios et al. | 701/3 |
| 2008/0203217 A1* | 8/2008 | Frank | 244/50 |
| 2008/0272234 A1* | 11/2008 | Thulbon | 244/102 R |
| 2009/0231197 A1* | 9/2009 | Richards | 342/377 |
| 2009/0261197 A1* | 10/2009 | Cox et al. | 244/50 |
| 2011/0024551 A1* | 2/2011 | Biest et al. | 244/6 |
| 2011/0046819 A1* | 2/2011 | Bailbe et al. | 701/3 |
| 2011/0202208 A1* | 8/2011 | Karnik et al. | 701/7 |
| 2012/0305704 A1* | 12/2012 | Hahn et al. | 244/103 W |
| 2012/0310452 A1* | 12/2012 | Hahn et al. | 701/16 |
| 2012/0330482 A1* | 12/2012 | Benmoussa | 701/3 |
| 2013/0233966 A1* | 9/2013 | Benmoussa | 244/50 |

\* cited by examiner

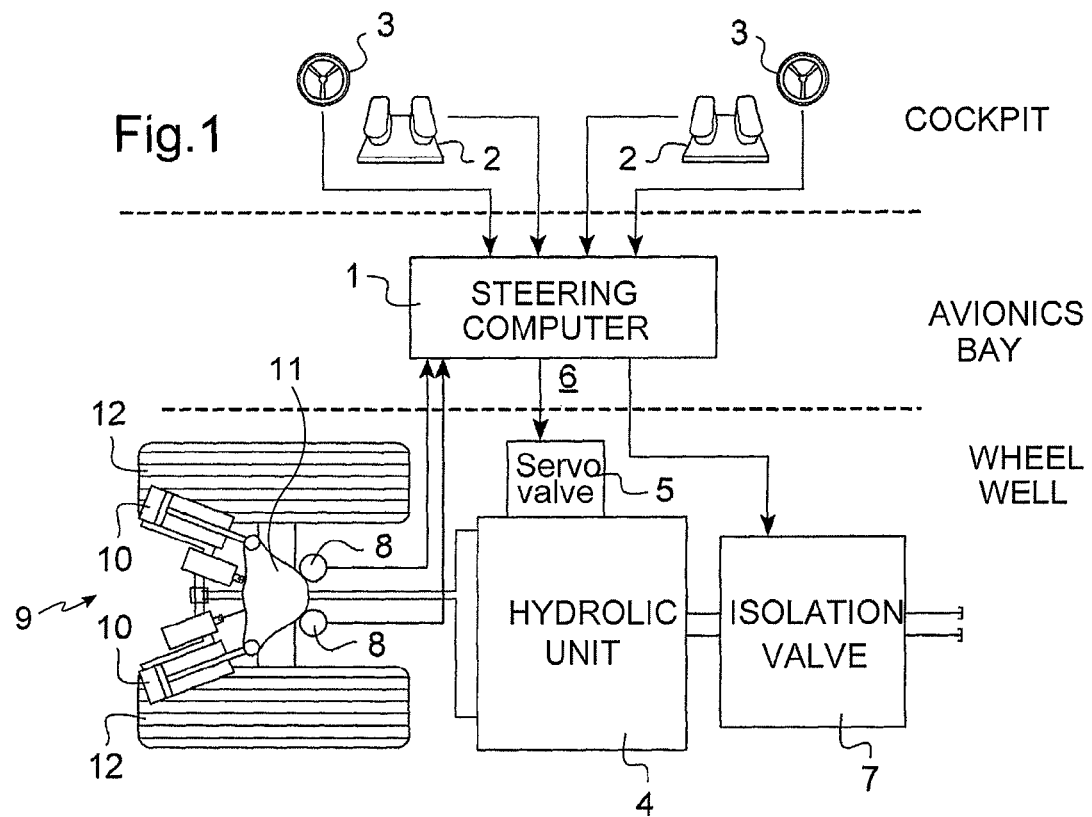
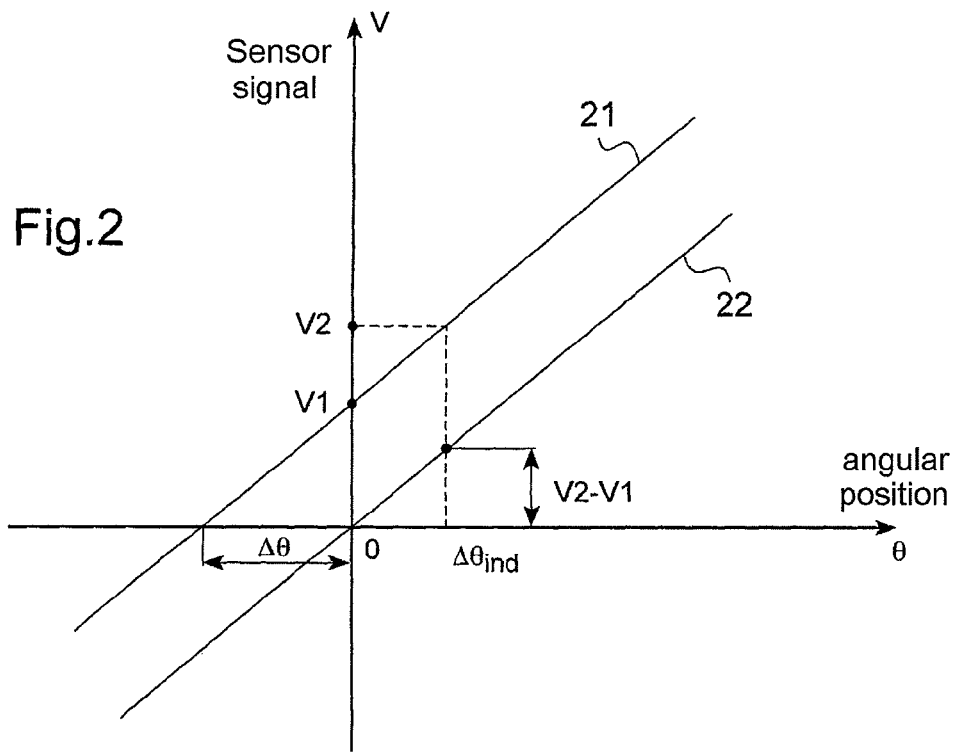

METHOD OF RESETTING THE ORIENTATION OF AN AIRCRAFT UNDERCARRIAGE HAVING A STEERABLE BOTTOM PORTION

The invention relates to a method of resetting the orientation of an aircraft undercarriage having a steerable bottom portion.

TECHNOLOGICAL BACKGROUND OF THE INVENTION

As shown in the diagram of FIG. 1, certain undercarriages are fitted with a steering member 10, here actuators in a push-pull configuration, serving to swivel a steerable bottom portion 11 carrying the wheels 12 of the undercarriage 9. The angular position of the steerable bottom portion is controlled on the basis of a setpoint generated by a steering computer 1, or by the pilot acting on pedals 2 or on a steering wheel 3.

This angular position setpoint is used in a servo-control system (e.g. of the proportional integral derivative (PID)) type that compares the angular position setpoint with a measured angular position of the steerable bottom portion, and in the event of a difference, the steering member is activated to cause the steerable bottom portion to swivel until the measured angular position is equal to the setpoint angular position. For this purpose, the aircraft has a hydraulic unit 4 that receives fluid under pressure and that is fitted with a servo-valve 5 for delivering the fluid in response to an order 6 coming from the steering computer 1, which fluid is delivered to the actuators of the steering member 10. In general, activation of steering control is authorized only if the aircraft is on the ground, with the undercarriage 9 then being compressed at least in part against an internal suspension force generated by the shock absorber internal to the undercarriage 9. For this purpose, an isolation valve 7 is controlled by the steering computer 1 to admit fluid under pressure into the hydraulic block 4 in response to detecting that the aircraft is on the ground.

Measuring the angular position of the steerable portion makes use of one or more sensors 8 arranged on the undercarriage in order to generate an electrical signal that is suitable for use in implementing such servo-control. In general, sensors are used that are arranged in such a manner that a departure in the signal from an electrical origin is proportional to a departure in the angular position from a particular angular position taken as an angular position origin, for example the sensors may be of the rotary variable differential transformer (RVDT) type in which the angle of rotation is proportional to the angle of rotation of the steerable bottom portion.

A procedure is generally provided for setting the electrical origin so that it matches the angular position origin. For this purpose, while the undercarriage is compressed at least in part, the aircraft is caused to run on the ground so as to impart an angular position on the steerable bottom portion that leads to the aircraft running in a straight line. This angular position is taken as the angular position origin, and the electrical origin of the angular position measurement signal is caused to correspond thereto.

Nevertheless, the angular position origin and the electrical origin can drift over time for various reasons (wear, maladjustment, . . . ), such that the two origins no longer correspond. Under such circumstances, the pilot is obliged to act continuously to request a small angular deviation in order to force the aircraft to run in a straight line.

OBJECT OF THE INVENTION

An object of the invention is to propose a method enabling the drawbacks associated with such drift to be diminished.

SUMMARY OF THE INVENTION

In order to achieve this object, the invention provides a steering resetting method for an aircraft undercarriage that includes a leg in which a steerable bottom portion is mounted to slide against a suspension force generated by a shock absorber, the undercarriage being provided with a controllable steering member for causing the steerable bottom portion to swivel in response to an angular position setpoint, the undercarriage also including at least one angular position sensor adapted to generate an electrical signal representative of the angular position of the steerable bottom portion and suitable for use in controlling the steering member. The resetting method of the invention comprises the step, performed when the steerable bottom portion is in an indexed angular position while the aircraft is in flight and the undercarriage is fully extended, of setting the electrical signal from the sensor to a determined reset value.

BRIEF DESCRIPTION OF THE DRAWINGS

FIG. 1 is a schematic illustration of a steering control system for a steerable bottom portion of an aircraft.

FIG. 2 is a graph showing the values V of the electrical signal from a position sensor as a function of the angular position θ of the steerable bottom portion.

DETAILED DESCRIPTION OF THE INVENTION

It is usual practice to make provision for an undercarriage that has a steerable bottom portion to include an angular indexing device, e.g. a cam device that, when the undercarriage is fully extended, imposes a determined angular position on the steerable bottom portion relative to the undercarriage leg (in general a position in which the wheels are on axis), so as to avoid any untimely swiveling of the steerable bottom portion of the undercarriage while it is being raised to its storage position in a wheel well, e.g. under the gyroscopic effect of the wheels continuing to turn if they have not been braked. Naturally, when the aircraft is on the ground, the cams of the indexing device are disengaged, so they can no longer prevent the steerable bottom portion from swiveling. The invention takes advantage of the existence of this indexed position in flight for resetting the signal from the measurement sensor by giving it a determined reset value, which amounts to resetting the electrical origin of the signal.

For this purpose, it is necessary to wait for the aircraft to have taken off and for the undercarriage to be fully extended, with this being detected by an extension sensor. The steering member is then normally deactivated so the angular position of the bottom portion is then determined by the angular indexing device, e.g. a cam device. An indexing value is then allocated to the electrical signal, which value is determined so that the aircraft will run in a straight line when on the ground and while the pilot or the steering computer is requesting a straight-ahead orientation.

A particular implementation of the method of the invention is explained below with reference to FIG. 2 which is a graph showing the values V of the electrical signal from the position sensor as a function of the angular position θ of the steerable bottom portion, with the origin being taken such that it corresponds to the angular position in which the aircraft runs in a straight line (referred to as the neutral position). The curve 21 is the curve of the electrical signal from the angular position sensor prior to being reset, and it can be seen that the signal from the sensor takes on a value V1 that is not zero. Thus, if the pilot or the steering computer were to set a zero angular position as the setpoint for the steerable bottom portion, then there would be an offset Δθ relative to the neutral position and the aircraft would not run in a straight line. The pilot would need to compensate by requesting a steering orientation equal to the offset Δθ in order to force the aircraft to run in a straight line.

Once the aircraft has taken off and the undercarriage has relaxed, the steerable bottom portion is in the indexed angular position θind at which the signal from the angular position sensor takes a value V2.

According to the invention, when the steerable bottom portion is in the indexed angular position θind, the signal is offset (in practice, on the graph, this offset corresponds to moving the signal in translation in a direction parallel to the ordinate axis) in such a manner that the value of the signal in this position is equal to the resetting value V2-V1.

This produces the curve 22 which is the curve for the reset signal. It can be seen that the reset signal takes the value zero when the steerable bottom portion is in the neutral position.

In practice, the neutral position and the indexed position are close together, and they might coincide. If they do coincide, then clearly the values V2 and V1 also coincide, such that the resetting value is zero.

By performing this resetting operation before any significant drift has had the time to become established, there is a reduction in the risk of any drift occurring that will lead to the aircraft running other than in a straight line when the pilot or the steering computer requests steering at zero orientation.

This resetting may be performed on each flight of the aircraft, or indeed on a flight that follows a maintenance operation on the undercarriage.

In preferred manner, the electrical origin of the angular position sensor is reset immediately before landing, after the undercarriage has been deployed. Naturally, in the deployed position, the undercarriage is still extended, and the steerable bottom portion is maintained in the angular position indexed by the indexing device.

This "mechanical" indexing provides accuracy of degree order, which is quite sufficient for ensuring high quality steering control.

Naturally, for safety reasons, it is appropriate to verify that the resetting operation remains within reasonable proportions (typically only a few degrees at most). If the resetting operation requires a large resetting value (typically more than 5°), that indicates that a malfunction of the sensors might have been generated by a critical failure and thus enables such a failure to be detected.

What is claimed is:

1. A steering resetting method for an aircraft undercarriage that includes:
    a leg in which a steerable bottom portion is mounted to slide against a suspension force generated by a shock absorber,
    a controllable steering member for causing the steerable bottom portion to swivel in response to an angular position setpoint, and
    at least one angular position sensor adapted to generate an electrical signal representative of the angular position of the steerable bottom portion and used in controlling the steering member,
the method comprising:
    the step, performed when the steerable bottom portion is in an indexed angular position while the aircraft is in flight and the undercarriage is fully extended, of resetting the electrical signal from the sensor to a determined reset value.

2. The method according to claim 1, wherein the reset value comprises:
    a difference between (1) a value of a non-reset signal as measured while the steerable bottom portion of the undercarriage is in the indexed angular position and (2) a value of the non-reset signal as measured while the aircraft is on the ground and the bottom portion of the undercarriage is set so as to cause the aircraft to run in a straight line.

3. The method according to claim 1, wherein the resetting step is performed on each flight of the aircraft.

4. The method according to claim 1, wherein the resetting step is performed after the undercarriage has been deployed and before the aircraft lands.

* * * * *